United States Patent [19]

Hordonneau et al.

[11] Patent Number: 4,568,594

[45] Date of Patent: Feb. 4, 1986

[54] REFRACTORY COMPOSITE REINFORCED WITH REFRACTORY FIBERS AND PROCESS FOR MANUFACTURING SAME

[75] Inventors: Alain Hordonneau, Saint-Aubin-de-Medoc; Bernard Capdepuy, Saint-Medard-en-Jalles; Louis Minjolle, Tarbes; Claudette Drouet, Juillan, all of France

[73] Assignee: Societe Nationale Industrielle Aerospatiale, Paris, France

[21] Appl. No.: 622,202

[22] Filed: Jun. 19, 1984

[30] Foreign Application Priority Data

Jun. 20, 1983 [FR] France ................. 83 10160

[51] Int. Cl.$^4$ .................. B32B 5/12; D02G 3/00; B05D 3/02
[52] U.S. Cl. .................. 428/113; 428/114; 428/375; 427/376.1; 264/60
[58] Field of Search ............... 264/60, 261, 58; 428/113, 105, 98, 109, 114, 232, 240, 241, 245; 427/376.1, 443.2

[56] References Cited

U.S. PATENT DOCUMENTS

| | | | |
|---|---|---|---|
| 3,681,113 | 11/1969 | Yoldas | 117/46 |
| 3,713,865 | 1/1973 | Leeds | 117/46 CC |
| 3,904,464 | 9/1975 | King | 156/148 |
| 4,001,478 | 1/1977 | King | 428/257 |
| 4,038,440 | 7/1977 | King | 428/245 |
| 4,165,355 | 8/1979 | Vasilos | 264/255 |
| 4,209,560 | 6/1980 | Vasilos | 428/109 |
| 4,252,588 | 2/1981 | Kratsch et al. | 156/73.6 |
| 4,268,560 | 5/1981 | Maistre | 428/105 |
| 4,278,729 | 7/1981 | Gibson et al. | 428/368 |
| 4,284,664 | 8/1981 | Rauch, Sr. | 427/180 |
| 4,390,583 | 6/1983 | Brazel | 428/113 |

*Primary Examiner*—John E. Kittle
*Assistant Examiner*—Thomas C. Saitta
*Attorney, Agent, or Firm*—Marshall, O'Toole, Gerstein, Murray & Bicknell

[57] ABSTRACT

The present invention relates to a ceramicized refractory composite and to a process for manufacturing same, wherein a multidirectional woven network is impregnated with a suspension of a ceramic powder and a fluid composition of a substance producing, under the action of heat treatment, a body of the same nature as the ceramic powder of said suspension.

6 Claims, No Drawings

REFRACTORY COMPOSITE REINFORCED WITH REFRACTORY FIBERS AND PROCESS FOR MANUFACTURING SAME

The present invention relates to a refractory material comprising a multi-directional network of refractory fibers and a refractory matrix disposed in the interstices of said network, such a material being adapted to present high mechanical strength and temperature resistance, for example with a view to producing heat shields and all parts for thermomechanical use.

A number of embodiments of refractory composites of this type, generally qualified as "ceramics", are already known. For example, in U.S. Pat. Nos. 4,165,355 and 4,209,560, the refractory network and matrix are gradually established, in alternate steps, from fibers and ceramic powder respectively, then the whole is subjected to hot pressure with a view to consolidation thereof. Such a process is long to carry out, particularly due to the production of the network in sections. Moreover, said network presents a low cohesion per se, since the fibers being used cannot be bonded to the fibers previously used and already incorporated in the ceramic powder.

To overcome these drawbacks, it has already been proposed to make said network of refractory fibers by weaving, independently of the production of the matrix, then to impregnate said woven network with a liquid or viscous bath of a refractory matter, said network thus impregnated being subjected to a heat treatment for drying and consolidation of the refractory matter of the bath. However, operation of a process of this type involves difficulties as far as the compactness of the composite obtained is concerned. In fact, it is impossible to subject this composite to compression after impregnation, without the woven network of refractory fibers deteriorating.

It is thus very important to fill the interstices of said woven network at the moment of impregnation, as completely as possible.

To this end, U.S. Pat. Nos. 3,904,464, 4,001,478 and 4,038,440 propose subjecting the impregnation bath to a combined pressure and suction, at the moment of impregnation. Such a process is often difficult to carry out. Consequently, it is preferable, as proposed in U.S. Pat. No. 4,278,729, to effect a plurality of successive impregnations, each followed by a heat treatment for drying and consolidation.

However, this method of multiple, alternate impregnations and heat treatments is not without drawbacks either.

In fact, the dimensions of the interstices are very heterogeneous (the spaces between the threads of roves of weaving yarns correspond to large pores, whilst the clearance between the elementary fibers constituting the threads or roves constitute fine pores), with the result that it is impossible to full them equally well with the impregnation bath. This results in the porosity of the refractory composite remaining considerable, and, in any case, very much greater than 30% by volume.

It is an object of the present invention to overcome this drawback by enabling composites of the above type, with very low porosity and therefore superior mechanical and thermal qualities, to be obtained.

To this end, according to the invention, the refractory composite comprising a multidirectional network woven from refractory fibers and a refractory matrix coating said network and obtained by repeated impregnations of said network previously made, with a fluid bath of a refractory matter, said network being subjected to a heat treatment for drying and consolidation after each impregnation, is noteworthy in that its rate of porosity, by volume, is at the most equal to 30%.

To obtain this remarkable result, according to the invention, the process for making a refractory composite comprising a multidirectional network woven from refractory fibers and a refractory matrix coating said network, process comprising repeatedly impregnating said network, previously made, with a fluid bath of a refractory matter and subjecting, after each impregnation, said network thus impregnated, to a heat treatment for drying and consolidation, is noteworthy in that said multidirectional network is impregnated with a suspension of a ceramic powder and with a fluid composition of a substance producing, under the action of a heat treatment, a body of the same nature as the ceramic powder of said suspension, and in that at least one of the two types of impregnation and heat treatment operations is repeated until a refractory composite is obtained whose rate of porosity by volume is at the most equal to 30%.

The ceramic powder suspension thus allows rapid filling of the largest pores of the network by means of ceramic particles of relatively large dimensions, whilst the fluid composition makes it possible to produce fine ceramic particles which penetrate in much smaller pores of the network and block them. A particularly compact ceramic matter is thus obtained without application of pressure.

Spread-out granulometry is thus used to advantage to improve the rates of filling (large particles in ceramic matter, small particles obtained by the fluid composition).

Moreover, it is possible in this way to employ different filling materials, from the large-grain ceramic powder to the fine-grain fluid composition, so as to modify the properties of the composite (coefficient of expansion, modulus of elasticity, density, refractoriness, chemical reactivity, etc.), as desired.

This process leads to a limited number of treatments, which contributes to obtaining a reduced cost price.

The ceramic matter of the fibers is preferably of silicon carbide, alumina, silicon nitride, zirconia, silica, an aluminosilicate or a silicon carbide/silicon nitride mixture.

To carry out the invention, a three-dimensional network of fiber yarns, for example silicon carbide of the quality of "Nicalon" sold by the firm Mitsui, is firstly woven by means of a special weaving machine of known type. The weaving may have the following particularities:

| Direction | Pitch | Number of yarns | Distribution by volume |
|---|---|---|---|
| X | 3 mm | 4 | 30% |
| Y | 3 mm | 4 | 30% |
| Z | 0.8 mm | 18 | 40% |

The coefficient of filling of the structure is 45% and its specific mass is 1.16 g/cm$^3$.

It is generally sought to obtain a woven network in which the volume of the fibers represents from 40 to 55%.

The ceramic powder suspension intended for impregnation of the network may be made in water containing, in addition to the ceramic powder, a deflocculating agent and a polyvinyl alcohol to facilitate consolidation after drying. The percentages of the different constituents by weight may be as follows:

water: from 20 to 60%
ceramic powder: from 40 to 80%
deflocculating agent: from 0 to 5%
polyvinyl alcohol: from 0 to 5%

The solution has a pH higher than 7 in order to increase the stability of the suspension.

The ceramic powders are preferably selected from the group formed by alumina, zirconia, silicon carbide, magnesia, silicon nitride, silica, aluminium titanate, boron nitride and titanium boride. Two or more ceramic powders may be mixed together in the suspension.

Furthermore, the fluid composition may be constituted by a salt, a gel, a solution or an organo-metallic compound of a matter yielding after heat treatment compounds identical to the ceramic powders used for the suspension. To make the fluid composition, salts, gels, organo-metallic compounds or solutions of decomposable matters may be mixed, provided that these mixtures yield, after heat treatments, compounds identical to the ceramic powders used for the suspension.

By carrying out the invention, a refractory composite is obtained, of which the composition by volume is as follows:

refractory fibers: from 40 to 55%
matrix: from 25 to 60%
porosity: at the most equal to 30%

The porosity is of course of function of the number of impregnation treatments imposed on the woven network.

Several examples of embodiments are given hereinafter.

EXAMPLE I

The substrate, woven in the manner indicated hereinabove, is firstly impregnated with an alpha alumina slip (alumina A 16 of the firm Alcoa) in suspension in water to which 0.05% of polyvinyl alcohol (Rhodoviol) and 1% of basic deflocculating agent (Darwan C) are added. Afer impregnation, the product is dried at 80° C. and treated at 800° C. (for 15 minutes) to consolidate the alpha alumina. A second impregnation is then effected with an alumina gel, then the impregnated substrate is dehydrated by heating to 80° C. for 15 minutes, then treated at 800° C. for 15 minutes.

The operations of impregnation and of heat treatment are repeated two or three times until a material of specific mass of at least about 2.5 g/cm$^3$, corresponding to a porosity of about 30%, is obtained. These operations may also be repeated several more times until a material of even lower porosity is obtained.

EXAMPLE II

The same woven substrate as in Example I is used and it is treated successively:
(a) with a zirconia slip (Zircoa C, of particles passing through sieve ASTM 325) in suspension in water to which 0.5% of Rhodoviol and 1% of deflocculating agent Darwan C are added, which is dried at 80° C., then subjected to heat treatment.
(b) then with a zirconyl acetate solution.

The same heat treatments as in Example I are applied.

EXAMPLE III

Electro-molten magnesia is used, then magnesium chloride.

EXAMPLE IV

The materials are of different natures. The first filling is obtained with the aid of silicon carbide, the second with aluminum chloride.

It should be noted that a plurality of different decomposable compounds (for example zirconyl acetate, then aluminium chloride) may be successively associated with a ceramic powder.

The invention is particularly applicable to the manufacture of ceramic parts for use at high temperatures, from 400° C. to 1800° C., particularly to Diesel engine or turbo-prop parts.

What is claimed is:

1. The method of fabricating a refractory composite comprising:

forming a multidirectional network from refractory fibers;

forming a refractory matrix on said multidirectional network by:
 (a) impregnating said network with a suspension of a ceramic powder and heat treating for drying and consolidation;
 (b) impregnating said network with a liquid composition of a substance producing, under the action of heat, a solid body of the same nature as the ceramic powder of said suspension, said substance having particles smaller than those of said ceramic powder, and heat treating for drying and consolidation; and
 (c) repeating at least one of steps (a) and (b) until a refractory composite having a porosity of not greater than 30% by volume is obtained.

2. The process of claim 1, wherein said refractory fibers are selected from fibers of silicon carbide, alumina, silicon nitride, zirconia, silica, an aluminosilicate or a silicon carbide/silicon nitride mixture.

3. The process of claim 1, wherein said ceramic powder is selected from the group consisting of alumina, zirconia, silicon carbide, magnesia, silicon nitride, silica, aluminum titanate, boron nitride and titanium boride powders.

4. The process of claim 3, wherein said suspension contains at least two ceramic powders.

5. The process of claim 1, wherein said fluid composition comprises a salt, a gel, a solution or an organometallic derivative of a material yielding after heat treatment compounds identical to the ceramic powders used in said suspension.

6. The process of claim 1, wherein said fluid composition is a mixture of salts, gels, organometallic compounds or solutions of decomposable materials.

* * * * *

UNITED STATES PATENT AND TRADEMARK OFFICE
CERTIFICATE OF CORRECTION

PATENT NO. : 4,568,594

DATED : February 4, 1986

INVENTOR(S) : Hordonneau et al.

It is certified that error appears in the above-identified patent and that said Letters Patent is hereby corrected as shown below:

Col. 1, line 58, "full" should be --fill--.

Col. 3, line 32 "of" (2nd occurrence) should be -- a --.

Col. 3, line 44, "Afer" should be --After--.

Signed and Sealed this

Twenty-seventh Day of May 1986

[SEAL]

Attest:

DONALD J. QUIGG

Attesting Officer

Commissioner of Patents and Trademarks